(12) United States Patent
Veltena (10) Patent No.: US 11,195,430 B2
(45) Date of Patent: Dec. 7, 2021

(54) MOVEMENT PLATFORM SYSTEM

(71) Applicant: E2M TECHNOLOGIES B.V., Amsterdam (NL)

(72) Inventor: Marinus Cornelis Christaan Veltena, Amsterdam (NL)

(73) Assignee: E2M TECHNOLOGIES B.V.

( * ) Notice: Subject to any disclaimer, the term of this patent is extended or adjusted under 35 U.S.C. 154(b) by 480 days.

(21) Appl. No.: 16/304,215

(22) PCT Filed: May 24, 2017

(86) PCT No.: PCT/EP2017/062557
§ 371 (c)(1),
(2) Date: Nov. 23, 2018

(87) PCT Pub. No.: WO2017/202920
PCT Pub. Date: Nov. 30, 2017

(65) Prior Publication Data
US 2020/0320897 A1 Oct. 8, 2020

(30) Foreign Application Priority Data
May 26, 2016 (EP) ..................................... 16171519

(51) Int. Cl.
*G09B 9/12* (2006.01)
*A63G 31/16* (2006.01)
*G09B 9/14* (2006.01)

(52) U.S. Cl.
CPC .............. *G09B 9/12* (2013.01); *A63G 31/16* (2013.01); *G09B 9/14* (2013.01)

(58) Field of Classification Search
CPC .......... A63G 31/00; A63G 31/16; G09B 9/02; G09B 9/08; G09B 9/12; G09B 9/14
(Continued)

(56) References Cited

U.S. PATENT DOCUMENTS 3,295,224 A 1/1967 Cappel
4,753,596 A 6/1988 Hart et al.
(Continued)

FOREIGN PATENT DOCUMENTS

| GB | 2328192 A | 2/1999 |
|----|-----------|--------|
| WO | 2013178828 A1 | 12/2013 |
| WO | 2015168799 A1 | 11/2015 |

OTHER PUBLICATIONS

International Preliminary Report on Patentability for PCT/EP2017/062557; dated Aug. 15, 2018; 18 pgs.
(Continued)

*Primary Examiner* — Kien T Nguyen
(74) *Attorney, Agent, or Firm* — Gardner Groff & Greenwald, PC (57) ABSTRACT

The invention is directed to an overdetermined movement platform system, comprising a base; a platform movable along 6 degrees of freedom relative to said base; at least eight long-stroke actuators, wherein each actuator couples the base with the platform and a controller which (a) is configured to adapt a demanded platform movement set-point to a commanded platform movement set-point, (b) is configured to move the eight long-stroke actuators such that the commanded platform movement set-point is achieved and (c) is configured to dynamically redistribute the forces as exercised by the actuators on the platform between the actuators.

17 Claims, 5 Drawing Sheets

(58) Field of Classification Search
USPC .............................. 472/59–61, 130; 434/55
See application file for complete search history.

(56) References Cited

U.S. PATENT DOCUMENTS

| | | | |
|---|---|---|---|
| 5,931,739 A | 8/1999 | Layer et al. | |
| 5,947,740 A * | 9/1999 | Kim | G09B 9/14 |
| | | | 434/29 |
| 6,162,058 A * | 12/2000 | Yang | A63G 31/16 |
| | | | 434/55 |
| 6,634,885 B2 * | 10/2003 | Hodgetts | G09B 9/12 |
| | | | 434/29 |
| 9,757,658 B1 * | 9/2017 | Kaufmann | A63G 1/00 |
| 2017/0072327 A1 | 3/2017 | Wach | |
| 2018/0233060 A1 * | 8/2018 | Warmerdam | G09B 9/00 |

OTHER PUBLICATIONS

International Search Report & Written Opinion for PCT/EP2017/062557; dated Aug. 2, 2017; 11 pgs.

* cited by examiner

MOVEMENT PLATFORM SYSTEM

The invention is directed to a movement platform system, comprising a base; a platform movable along 6 degrees of freedom relative to said base and long-stroke actuators coupling the base with the platform and a controller which controls the movement of the platform through the long-stroke actuators.

Movement platform systems are known as such. A well-known example is a flight simulator comprising the so-called Gough-Stewart platform as described in U.S. Pat. Nos. 3,295,224 and 4,753,596. Such platforms are widely used for the simulation of civil and military aircraft for the training of pilots. More recently such platforms are also used for recreational end-uses in so-called rides at theme parks. The platforms are provided with six actuators to provide 6 degree of freedom movements. Especially for recreational end-uses redundant systems are required. With redundant systems is here meant that in a situation that one of the actuators would fail, i.e. break, the platform and its passengers would safely return to a safe position. Until now redundant systems have been developed wherein next to each of the six actuators a second actuator was positioned. In case one of the actuators would fail the parallel positioned actuator could take over and return the platform to a safe position. A disadvantage of such a system is that it requires 12 actuators instead of six and that the system becomes very bulky.

U.S. Pat. No. 5,931,739 describes a fail-safe ride simulator having three actuators and having a fail-safe circuit which is arranged to continuously monitor the condition of the actuator mechanism and cause the platform to move automatically towards a safe position in the event of an unsafe condition in the actuator mechanism. The disadvantage of this fail-safe simulator is that in the event of a total failure of one of the actuators the remaining two actuators may not be able to return the platform to the safe position.

The aim of the present invention is to provide a redundant 6 degree of freedom movement simulator which does not have the disadvantages of the above described system.

This aim is achieved with the following movement simulator. An overdetermined movement platform system, comprising a base; a platform movable along 6 degrees of freedom relative to said base; at least eight long-stroke actuators, wherein each actuator couples the base with the platform and a controller which (a) is configured to adapt a demanded platform movement set-point to a commanded platform movement set-point, (b) is configured to move the at least eight long-stroke actuators such that the commanded platform movement set-point is achieved and (c) is configured to dynamically redistribute the forces as exercised by the actuators on the platform between the actuators.

By providing at least eight actuators a redundant system is obtained, even having a one fold redundancy and in some situations an even two-fold redundancy. This because if an actuator would fail the remaining seven or respective six actuators would still be able to fully control the platform and optionally bring the platform to a safe position. If two actuators fail the redundancy will depend on how they are configured relative to each other. A consequence of the overdetermined system is that, depending on the orientation of the actuators with respect to the payload, two specific patterns of relative actuator force exist which merely deforms the platform. This is commonly referred to as actuator force-fight. The controller of the platform system according to the invention enables one to dynamically redistribute forces between actuators by actively controlling these force-fights.

A further advantage of for example a platform system with eight actuators is that when one single actuator would encounter a so-called single actuator run away the remaining seven actuators would compensate for such a run away and mediate any negative results. Further advantages are that the eight actuators are more vertically positioned as compared to the six-actuator prior art design. This is advantageous because it makes the eight actuators more effective in countering gravity. The higher number of actuators further results in that less powerful actuators can be applied in the simulator according to the invention as compared to the six-actuator prior art design. Furthermore the workspace of the simulator according to the invention has eight constrains instead of six. As a consequence the workspace, i.e. the space in which the simulator can move, is more symmetrical and compact. The workspace of the six-actuator prior art design has a volume of which parts are hardly ever used but are worst case in terms of actuator forces. Such parts of the workspace do not exist for the simulator according to the invention. This means that for example the motor and servo drive power of an electromechanical actuator can be less for the simulator according to the invention. It is evident that the above advantages are also valid or even more valid when more than eight actuators are present. Suitably the number of actuator will not exceed 24 for practical reasons. In the description reference is made to a platform system having eight actuators. The disclosure is also valid for platform systems having more than eight actuators if not expressly excluded.

Suitably all actuators contribute to the movement of multiple degrees of freedom. Such a system is also referred to as a synergistic system. An overdetermined synergistic platform system according to the invention can also be used as a solution to achieve larger angular displacements than are possible with the prior art synergistic determined motion systems. The angular displacements of determined synergistic motion systems are limited by the occurrence of mechanical singularities where the actuator forces required for platform movements and for counteracting gravity become infinite. In a properly designed overdetermined synergistic platform system according to this invention, these mechanical singularities are cancelled by the redundant actuators. However, where a prior art synergistic motion system can have regions in the workspace where mechanical singularities exist, an overdetermined synergistic platform system can have regions in the workspace where the redundancy of the mechanism is locally reduced. These are regions where any group of 6 actuators from the total number of actuators has developed a mechanical singularity. The remaining (redundant) actuators will however cancel the singularity. The cancelled mechanical singularity has thus effectively reduced the redundancy in that region of the workspace. In these regions of cancelled mechanical singularity, a non-zero force-fight may be required to minimize actuator forces.

Hexapod platform systems having high actuator velocities, such as for example 1 m/s or higher, will usually be provided with hydraulic actuators having a relatively elongated brake zone. Such a zone is required in case of a failure of such a single actuator. These brake zones result in that the length of the actuator increases and thus the size of the entire platform. With the platform system according to the invention such elongated brake zones are not required because in case of a failure of one actuator the remaining 7 actuators will ensure that the failed actuator will stay away from its end zone thereby eliminating the need for an elongated brake zone.

By long stroke actuators is here meant any actuator which can extend more than 10% of its length starting from its most compressed position. The starting length is here defined as the distance between the two connecting points as present at each end of the actuator. If for example the present movement platform system is used for recreational end-uses in so-called rides at theme parks the length the long stroke actuators may extend is suitably more than 10 cm. The long stroke actuators may be hydraulic actuators, electromechanical actuators or electromagnetic actuators, preferably electromechanical actuators.

The above advantages are largely due to the fact that the platform system according to the invention is an overdetermined system. The platform system is overdetermined because the number of degrees of freedom of the system, i.e. 6 degrees of freedom, is smaller than the number of actuators. Such overdetermined systems have not before been applied for a movement platform system having at least eight long stroke actuators. Especially not for a system wherein the platform movement is controlled in at least its position, velocity and acceleration domain. Physically this leads to an underdetermined control problem for the actuators because the state of the platform does not fully determine the state of the actuators. Because an induvial platform is rigid, the platform movement state, expressed in position, velocity and acceleration, uniquely determines actuator position, velocity and acceleration of all actuators but not uniquely their force. The solution space contains infinite solutions for actuator force that not only result in the desired platform movement but also attempt to deform the platform. This is the referred to force-fight.

Hexapods having 6-degrees of freedom and six actuators are not overdetermined. This is because the platform can freely move in all its 6-degrees of freedom for all combinations of movement of its six actuators.

The commanded and demanded platform movement set-point may be a platform position set-point. Preferably the commanded and demanded platform movement set-point is a commanded and demanded set-point for platform position, velocity and acceleration.

The demanded platform movement set-point may be the output of a simulation program or host of for example the recreational ride or of a flight simulation program or host. The demanded movement set-point may be directly provided from a simulation program or host or may be the output of a motion cueing filter. Such a motion cueing filter may minimize movements which do not contribute to the desired motion cuing experience.

The demanded set-point for platform position, velocity and acceleration may also be the output of a program which is designed to compensate for large motions of the base of the platform system such that the platform itself remains in a stable position. Such a moving base is suitably part of a vessel which moves due to waves.

In the aforementioned applications the demanded set-point is not known upfront. This may result in that the commanded set-point would drive the movement platform system out of its operational and performance limits. Such predetermined operational and performance limits may comprise of platform domain limits, actuator domain limits and motor current domain limits in case the actuator is an electromechanical actuator or an electromagnetic actuators. When hydraulic actuators are used the performance limits would comprise of hydraulic system domain limits. Examples of operational and performance limits when electromechanical actuators are used are provided in the detailed description for formula (1) below. a platform domain limits are excursion limits. Examples of actuator domain limits are the extreme actuator positions, i.e. extracted and compressed positions of an actuator, maximum motor velocity, maximum motor or servo-drive continuous- or peak current, maximum electrical power, maximum motor temperature. Examples of hydraulic actuator domain limits are the continuous- and peak hydraulic flow limit.

The controller and especially part (c) of the controller is based on a local linearization of the movement platform system equations of motion. The stability of this controller may be unfavorable outside the performance limits due to non-linearity of the system outside the performance limits. Furthermore external forces, such as actuator buffer forces, may act on the actuators which are not modelled or timed incorrectly. For these reasons it is preferred to use a controller comprising of a guidance module configured to adapt a demanded platform movement set-point to a commanded platform movement set-point by a counter movement and configured to calculate a force-fight set-point wherein the counter movement and force-fight set-point are derived from a model predictive control algorithm which uses a cost-minimizing control strategy. Preferably the long stroke actuators are electromechanical actuators provided with a motor configured to receive a motor current from a servo drive and wherein the platform system has predetermined performance limits comprising of platform domain limits, actuator domain limits and motor current limits and wherein the model predictive control algorithm uses a cost-minimizing control strategy which is configured to let the platform stay within its performance limits.

The counter movement of the platform aims to let the platform stay within its performance limits. The generation of a force-fight set-point results in that a better balance the load between the actuators such that motor current constraints per actuator are not exceeded, or such that motor currents are optimized. The force-fight set-point may in most situations be zero. The force fights set-point may deviate from zero when for example an individual actuator exceeds a predetermined force and/or when an individual actuator would have a predetermined and defined near zero velocity and force set-point. It has been found when an individual actuator has a near zero velocity and force set-point an instable system may be obtained which could result in undesirable vibrations. By allowing a small force fight, such undesirable vibrations may be avoided.

The guidance module is suitably configured to adapt the demanded set-point to a commanded set-point by a counter movement for the platform and by a force-fight set-point. The counter movement and force-fight set-point are derived from a model predictive control (MPC) algorithm, which calculates a predicted workspace of the platform. The model predictive control algorithm may be an unconstrained or constrained model predictive control algorithm. The model predictive control algorithm uses a cost-minimizing control strategy. Suitably the predicted workspace is calculated by performing a single DOF excursion analysis for the predicted platform state as for example described in more detail in U.S. Pat. No. 8,996,179(B2).

The guidance module makes use of a kinematic model of the movement platform system, and of the inverse equations of motion of the movement platform system which is a model that is derived from the kinematic-, mass- and performance model of the movement platform, actuators and motors. The cost function will allocate costs to a constrained property associated with the above referred to performance limits. In addition, there is a cost associated by not following the demanded platform movement. The counter movement, also referred to as a washout acceleration, and force-fight set-point are computed using an optimal controller that minimizes this cost function. The guidance module is configured to be executed at each computational cycle of the controller.

The guidance module may be configured in different manners. It is assumed that, for example the host drive-file, is properly designed to optimize motion cues as communicated as the demanded platform movement set-point. The guidance module should interfere as little as possible in order to avoid the user experiencing a different motion cue from the demanded motion cue. The guidance module is therefore suitably designed to track the demanded set-point as closely as possible. Preferably the cost-minimizing control strategy (i) minimizes platform tracking errors in position, velocity and acceleration, (ii) stays within the position and velocity limits of the actuator, (iii) minimizes motor currents and/or minimize force-fight and (iv) protects against over-current. Alternatively the cost-minimizing control strategy (v) minimizes specific force errors, (vi) stays within the position and velocity limits of the actuator, (vii) minimizes motor currents at the expense of a non zero force-fight, for example in the regions of cancelled mechanical singularities, and/or (viii) minimize force-fight and (ix) protects against over-current.

Suitably the cost function for the guidance module for an unconstrained model predictive control algorithm may be as below:

$$J = J_{Pt} + J_{Vt} + J_{At} + J_{Ve} + J_{Ae} + J_{pe} + J_{ve} + J_{Ie} + J_{FF} \quad (1)$$

wherein:

$J_{Pt}$ is the cost function for the platform position tracking error. This cost function assigns a cost to the difference between the demanded set-point for platform position and the commanded set-point for platform position.

$J_{Vt}$ is the cost function for the platform velocity tracking error. This cost function assigns a cost to the difference between the demanded set-point for platform velocity and the commanded set-point for platform velocity.

$J_{At}$ is the cost function for the platform acceleration tracking error. This cost function assigns a cost to the difference between the demanded set-point for platform acceleration and the commanded set-point for platform acceleration.

$J_{Ve}$ is the cost function for platform excess of velocity in all 6 degrees of freedom. The platform excess velocity cost function assigns a cost to an excess of platform velocity. It can be used to define the operational velocity limits at platform level. As there are no cross-couplings, it is defined for each degree of freedom individually as a scalar function.

$J_{ae}$ is the cost function for platform excess of acceleration in all 6 degrees of freedom. The platform excess of acceleration cost function assigns a cost to a platform acceleration that exceeds a predetermined limit value. It can be used to reduce the operational platform acceleration limits. As there are no cross-couplings, it is defined for each degree of freedom individually as a scalar function.

$J_{pe}$ is the cost function for the position of the eight actuators excess. The objective of the actuator excess of position cost function is to avoid that actuators exceed their position travel. In order to enable the actuators to smoothly brake at their end stops, the position cost function is suitably a function of the actuator speed.

$J_{ve}$ is the cost function for the excess of velocity of the eight actuators. Note that the actuator velocity is constrained by a maximum value and a braking profile near the end-stops.

$J_{Ie}$ is the cost function for excess of motor current of the eight actuators. This cost function may be configured to achieve a Least Squares current for all motors combined or to limit the maximum motor current allowed. The motor current may be expressed as a function of platform acceleration, the force-fight value and the static weight of the platform.

$J_{FF}$ is a cost function which assigns a cost to the presence of a force-fight between the actuators.

Weight factors for the above individual cost functions are set when tuning the controller.

For a given demanded set-point for platform position, velocity and acceleration the total cost J can be minimized by construction of a washout acceleration:

$$\vec{a}_{wo} = (a_x\ a_y \ldots a_\psi)^T \quad (2)$$

wherein wo refers to the platform, x,y, ... ψ in the vector refers to the six degrees of freedom, and a force-fight set-point:

$$\vec{f} = (f_{ip}, f_{op})^T \quad (3)$$

wherein $f_{ip}$ refers to the in-plane force fight and $f_{op}$ refers to the out-of-plane force fight. The in-plane force fight is the situation wherein both diagonals of the platform are squeezed together by in-plane forces. The out-of-plane force fight is the situation that one diagonal of the platform is pushed up and one diagonal of the platform is pushed down by forces perpendicular to the plane of the rectangular platform.

For a time instant Δt into the future a $2^{nd}$ order Taylor approximation of the cost function (1).

$$J(\Delta t) = J(0) + \frac{\partial J}{\partial \vec{x}} \Delta \vec{x} + \frac{1}{2} \frac{\partial^2 J}{\partial \vec{x}^2} \Delta \vec{x}^2 \quad (4)$$

In which:

$$\vec{x} = (\vec{a}_{wo}, \vec{f}) \quad (5)$$

At a time Δt the cost is minimized for:

$$\Delta \vec{x} = J(\Delta t) = \left(\frac{\partial^2 J}{\partial \vec{x}^2}\right)^{-1} \frac{\partial J}{\partial \vec{x}} \quad (6)$$

Which means that the optimal rate of change for $\dot{\vec{x}}$ is given by:

$$\dot{\vec{x}} = \frac{1}{\Delta T} \left(\frac{\partial^2 J}{\partial \vec{x}^2}\right)^{-1} \frac{\partial J}{\partial \vec{x}}. \quad (7)$$

To avoid semi-static offsets and drifts a tracking loop is suitably part of the controller. The tracking loop is configured to adjust the commanded platform movement set-point such that the steady-state error between the commanded platform movement set-point and a measured platform movement is decreased towards zero.

Suitably the actuators are electromechanical actuators provided with a motor configured to receive a motor current from a servo drive. For such a platform system the controller is comprised of a control law module which is configured to (b) move the eight long-stroke actuators such that the commanded platform movement set-point is achieved and (c) is configured to dynamically redistribute the forces as exercised by the actuators on the platform between the actuators by providing a velocity and motor current set-point for each individual servo drive using the platform movement set-point and wherein the motor current set-point is compensated for the difference of the actual force fight signal and the force fight set-point as obtained in the guidance module.

The controller of a platform system provided with electromechanical actuators provided with a motor configured to receive a motor current from a servo drive is suitably comprised of the following control law module. Control law module which is configured as a Multiple Input Multiple Output controller to (b) move the at least eight long-stroke actuators such that the commanded platform movement set-point is achieved and (c) is configured to dynamically redistribute the forces as exercised by the actuators on the platform between the actuators by two feed forward paths (x) and two feedback paths (y). In the two feed forward paths (x) the velocity set-point for each individual servo drive is determined using the commanded platform movement set-point as input and the motor current set-point is determined using the commanded platform movement set-point and the force fight set-point as input. In the two feedback paths (y) the error between actual platform movement and the commanded platform movement set-point is reduced and wherein the motor current set-point is adapted such that the difference between actual force-fight and the force-fight set-point is counter acted. The control law module will make use of a kinematics model of the movement platform and its inverted equations of motion.

In the above movement platform system each electromechanical actuator is suitably provided with a sensors configured to obtain measured actuator position and velocity sensor data. The actual platform movement in path (y), preferably in position and more preferably in position, velocity and acceleration, is reconstructed using a backwards kinematics model of the motion platform system wherein the measured actuator position and velocity sensor data is used as input. This tracking loop as part of (y) is configured to adjust the commanded set-point for platform position such that the steady-state error between the commanded set-point for platform movement and the measured platform movement is decreased towards zero.

The actual force-fight signal in (y) between the eight actuators for electromechanical actuators is determined using the actual motor currents of the servo drives, the acceleration of the actuators and the platform position as input. The actual force fight of a platform with eight actuators and a platform having four corners and two diagonals is (i) the force-fight of the eight actuators in the plane of the platform which force-fight causes in-plane deformation where both diagonals of the platform are squeezed together and (ii) the force-fight of the eight actuators perpendicular to the plane of the platform which force-fight causes out-of-plane deformations where one diagonal of the platform is pushed up and one diagonal of the platform is pushed down.

The platform and the base of the platform system may have any shape which is suited to connect the base via the at least eight actuators to the platform. In case of eight actuators the base and platform may be rectangular, suitably square. Other planes having four corners, such as a trapezium is also conceivable.

The long stroke actuator is suitably a electromechanical actuator of the in-line direct drive actuator type comprising a motor directly mounted on the ball screw shaft of the electromechanical actuator. This type is preferred over a folded actuator using belts or chains because it results in a platform system having in use less acceleration noise and audible noise. The motor is suitably a torque motor. The actuator may be provided with an elastomer buffer to absorb a failure when the actuator is in full compression. The actuator may be provided with an crush tube to absorb a failure when the actuator is in full extension. Suitably each actuator is provided with a sensor for measurement of motor position and velocity having output means connected to the controller via the servo drive. The position and velocity sensor signals are used for reconstruction of the actuator and platform position and preferably position, velocity and acceleration.

Suitably the motor phases of the torque motor are connected to a short coil brake resistor. Such a short coil brake resistor is advantageous in case of a power or other failure. In such a situation the actuators will have compressive actuator forces for any static position within the workspace resulting in that the platform system will return to a predetermined safe position passively on the short coil brakes under gravity. There is no need for an active return to home system as for example described in U.S. Pat. No. 5,931,739. The motor phases will be connected to the short coil brake resistors by a short coil brake circuit. In case of failure the electromechanical actuator acts as a damper wherein the kinetic and potential energy is dissipated in the resistors causing the actuator to decelerate and move down to settled position with limited speed.

Each long stroke actuator is suitably connected to the platform and to the base by means of a universal joint having two rotational degrees of freedom. Each joint may comprise of a machined steel housing and a shaft that runs in two tapered roller bearings or a needle bearing as part of the platform or base. Preferably the platform and base is provided with needle bearing because this enables the largest possible shaft diameter, where the bending moment has its maximum value, while still maintaining limited outside dimensions of the platform system. The lower bearing units as part of the base may be "siamized" (combined) in order to reduce the spacing between two joints. Such a siamized structure is allowed because failure of such a lower bearing is not critical due to the fact that the platform system itself has a two-fold redundancy.

The invention is also directed to a method to control an overdetermined movement platform system comprising a base; a platform movable along 6 degrees of freedom relative to said base; at least eight long-stroke actuators coupling the base with the platform by performing a guidance step (a) and a control law step (b), wherein in guidance step (a) a demanded platform movement set-point is adapted to a commanded platform movement set-point by calculating a counter movement for the platform and by calculating a force-fight set-point, wherein the counter movement and force fight set-points are derived using a model predictive control algorithm which uses a cost-minimizing control strategy, and in control law step (b) the long-stroke actuators are moved such that the commanded platform movement set-point of (a) is achieved while dynamically redistributing the forces as exercised by the actuators on the platform between the actuators according to the force-fight set-point obtained in (a).

The number of actuators may be as described for the platform. The preferred embodiments and explanations mentioned for the platform are also valid for this method. Some preferred embodiments are described below.

Suitably the commanded and demanded platform movement set-point is a commanded and demanded set-point for platform position, velocity and acceleration.

The control law step (b) is suitably comprised of a feed forward path (x) and a feedback path (y). Feed forward path (x) comprises of two feed forward paths wherein the velocity set-point for each individual servo drive is determined using the commanded or adjusted commanded platform movement set-point as input and the motor current set-point is determined using the commanded or adjusted commanded platform movement set-point and the force fight set-point as input. Feedback path (y) comprises of two feedback paths wherein the error between actual platform position, velocity and acceleration and the commanded or adjusted commanded platform movement set-point is reduced, wherein measured actuator position and velocity sensor data is used to reconstruct the actual platform position, velocity and acceleration using a backwards kinematics model of the motion platform system, and wherein the motor current set-point is adapted such that the difference between actual force-fight and the force-fight set-point is counter acted.

Suitably the commanded and demanded platform movement set-point is a commanded and demanded set-point for platform position and wherein the position of each actuator is measured, a measured platform position is calculated using the measured actuator positions as input in (y) in a backward kinematics model and wherein the commanded set-point for position is adjusted to obtain an adjusted platform movement set-point by decreasing the steady state error towards zero between the commanded set-point for platform position and the measured platform position. Preferably the commanded and demanded platform movement set-point is a commanded and demanded set-point for platform position, velocity and acceleration and wherein the position, velocity and acceleration of each actuator is measured, a measured platform position is calculated in (y) using the measured actuator position, velocity and acceleration as input in a backward kinematics model and wherein the commanded set-point for position is adjusted to obtain an adjusted platform movement set-point by decreasing the steady state error towards zero between the commanded set-point for platform position and the measured platform position.

Suitably the long stroke actuators are electromechanical actuators provided with a motor which receive a motor current from a servo drive. The platform system has predetermined operational and performance limits comprising of platform domain limits and actuator domain limits, including motor and servo-drive limits. The model predictive control algorithm may then suitably use a cost-minimizing control strategy which is configured to let the platform stay within its performance limits.

Suitably in the control law step (b) the forces as exercised by the actuators on the platform are dynamically redistributed between the actuators by providing a velocity and motor current set-point for each individual servo drive using the adjusted platform movement set-point. The motor current set-point is compensated for the difference of an actual force fight signal and the force fight set-point as obtained in the guidance module.

Suitably control law step (b) is comprised of a feed forward path (x) and a feedback path (y) according to (x) two feed forward paths wherein the velocity set-point for each individual servo drive is determined using the commanded as input and the motor current set-point is determined using the commanded or adjusted commanded platform movement set-point and the force fight set-point as input and (y) two feedback paths wherein the error between actual platform position, velocity and acceleration and the commanded or adjusted commanded platform movement set-point is reduced and wherein the motor current set-point is adapted such that the difference between actual force-fight and the force-fight set-point is counter acted.

The actual platform position, velocity and acceleration may be reconstructed using a backwards kinematics model of the motion platform system and measured actuator position and velocity sensor data as input. The actual force-fight between the actuators may be determined using the actual motor currents of the eight servo drives, the actual acceleration of the eight actuators and the platform position as input. For a platform having eight actuators and a platform having four corners and two diagonals the force fight is defined as (i) the force-fight of the eight actuators in the plane of the platform which force-fight causes in-plane deformation where both diagonals of the platform are squeezed together and (ii) as the force-fight of the eight actuators perpendicular to the plane of the platform which force-fight causes out-of-plane deformations where one diagonal of the platform is pushed up and one diagonal of the platform is pushed down.

The invention shall be illustrated by the following non-limiting figures.

Figure 1:
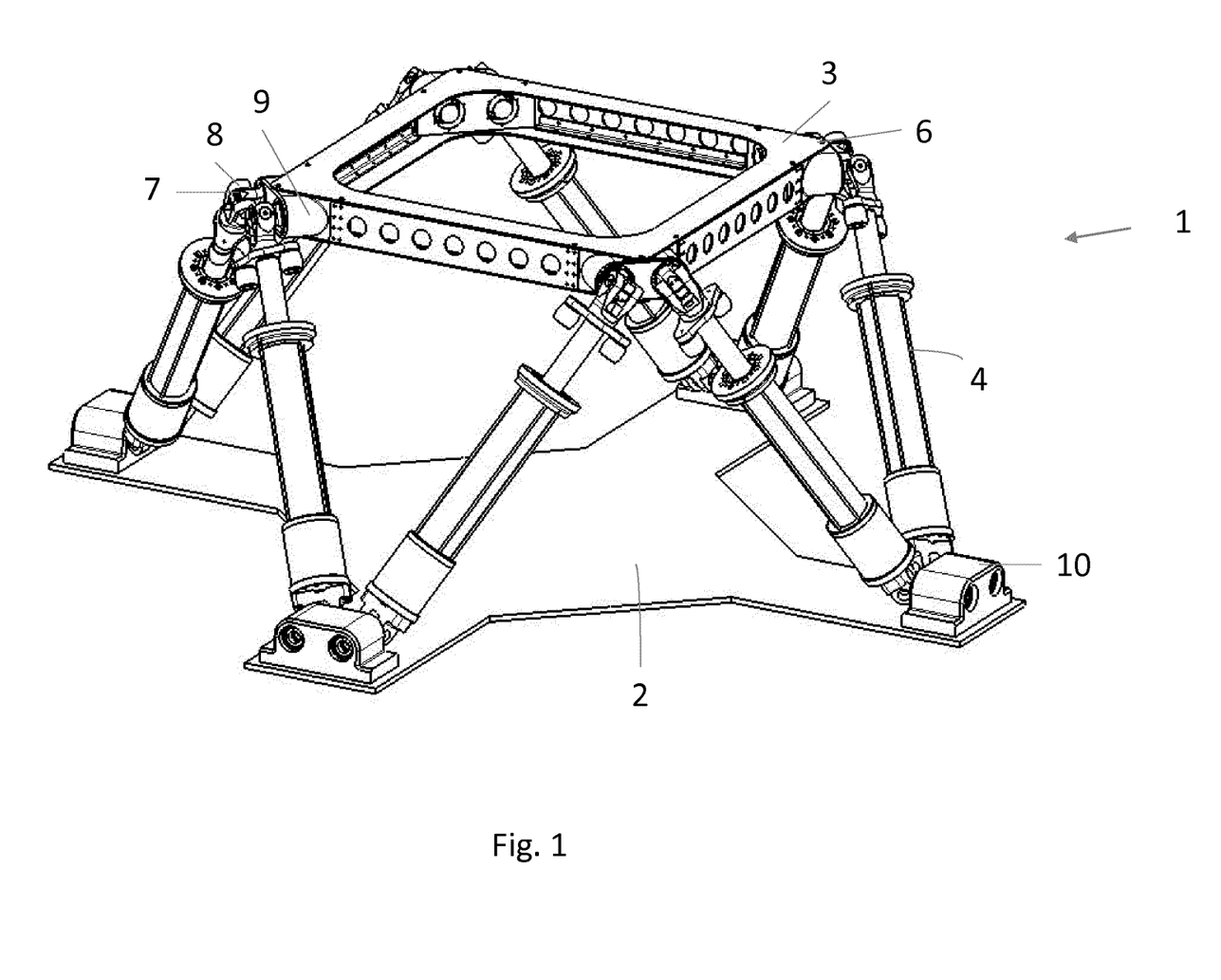
FIG. 1 shows a perspective view of a movement platform system according to an example embodiment.

FIG. 1 shows a movement platform system (1), comprising a rectangular base (2); a rectangular platform (3) movable along 6 degrees of freedom relative to said base (2), eight long-stroke actuators (4). The eight actuators (4) directly couple the base (2) with the platform (3). The base has four corners (5), wherein at each corner the lower ends of two actuators (4) are pair wise connected to said base (4). The platform has four corners (6), wherein at each corner the upper ends of two actuators (4) are pair wise connected to the platform (3). The actuators (4) are connected to said base (4) and platform (3) via a universal joint (7) having two rotational degrees of freedom. The universal joint (7) has a machined steel housing (8) linked at one end to the end of the actuator and at its other end rotatable connected to a needle bearing (9). The needle bearings (9) located at the same elevation as the corners (6) of the platform at either side of corner (6) and pointing away from said platform (3). By connecting the needle bearings directly at the same elevation of the corner (6) of the platform in the same plane as the platform (3) a platform system (1) is obtained having a low centre of gravity. A low centre of gravity will reduce the forces exercised on the platform system, lower the power consumption and enables one to make use of less powerful actuators. In addition the eye point of the user as positioned, in use, on top of the platform, e.g. in a cabin or the like, will be lowered relative to the so-called motion platform centroid (MPC). This will result in an improved motion cuing, i.e. less parasitic acceleration, because the vertical distance between the MPC and the user eye point is reduced. The MPC is the geometrical centre of the octagon formed by the 8 joint centres. Finally because the height of the entire platform system and possible cabin or other structure placed on top of the platform system can be lowered it is possible to place the platform system in a building with a lower ceiling.

The needle bearings (9) of a pair of universal joints (7) at the corners (5) of the base (2) are siamized or combined in one housing (10) such that the distance between said needle bearings is minimized.

Figure 2:
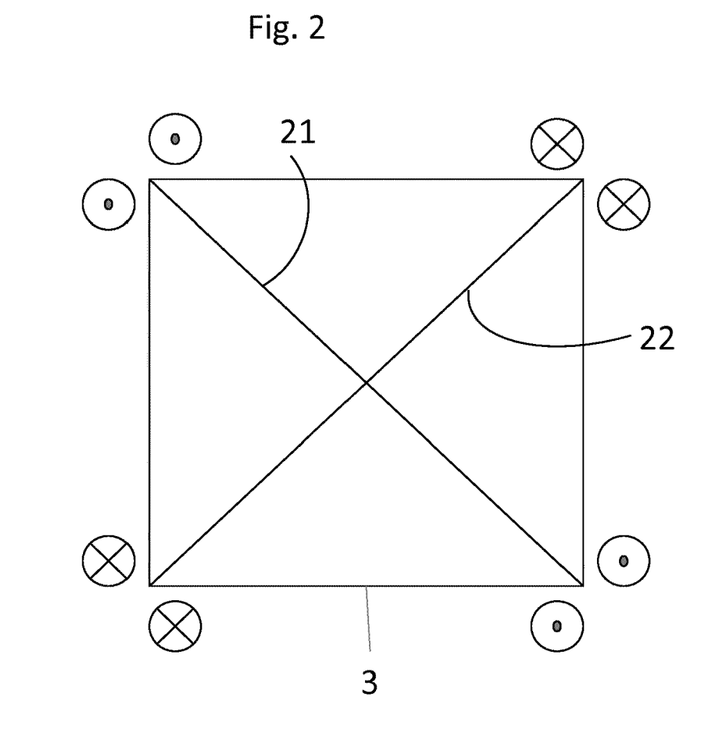
FIG. 2 is a force diagram indicating downward and upward forces as exercised by the actuators on the corners of the platform of FIG. 1 perpendicular to the plane of the rectangular platform.

FIG. 2 shows platform (3) from above. The circles with a dot and the circles with a cross represent the respective downward and upward forces as exercised by the eight actuators on the corners (6) of the platform (3) perpendicular to the plane of the rectangular platform (3). These forces cause a force-fight which causes out-of-plane deformations where one diagonal (22) of the platform (3) is pushed up and one diagonal (21) of the platform (3) is pushed down.

Figure 3:
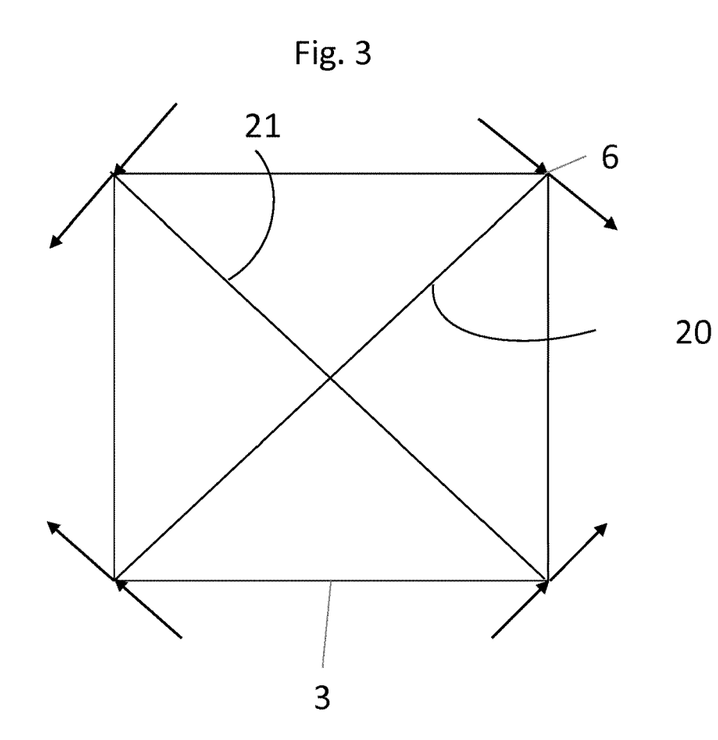
FIG. 3 is a force diagram indicating forces as exercised by the actuators in the plane of the platform of FIG. 1.

FIG. 3 shows the platform (3) from above. The arrows represent a force as exercised by the eight actuators in the plane of the platform (3) on the corners (6) of platform (3) resulting in a force fight wherein an in-plane deformation will occur where both diagonals (20,21) of the platform (3) are squeezed together.

Figure 4:
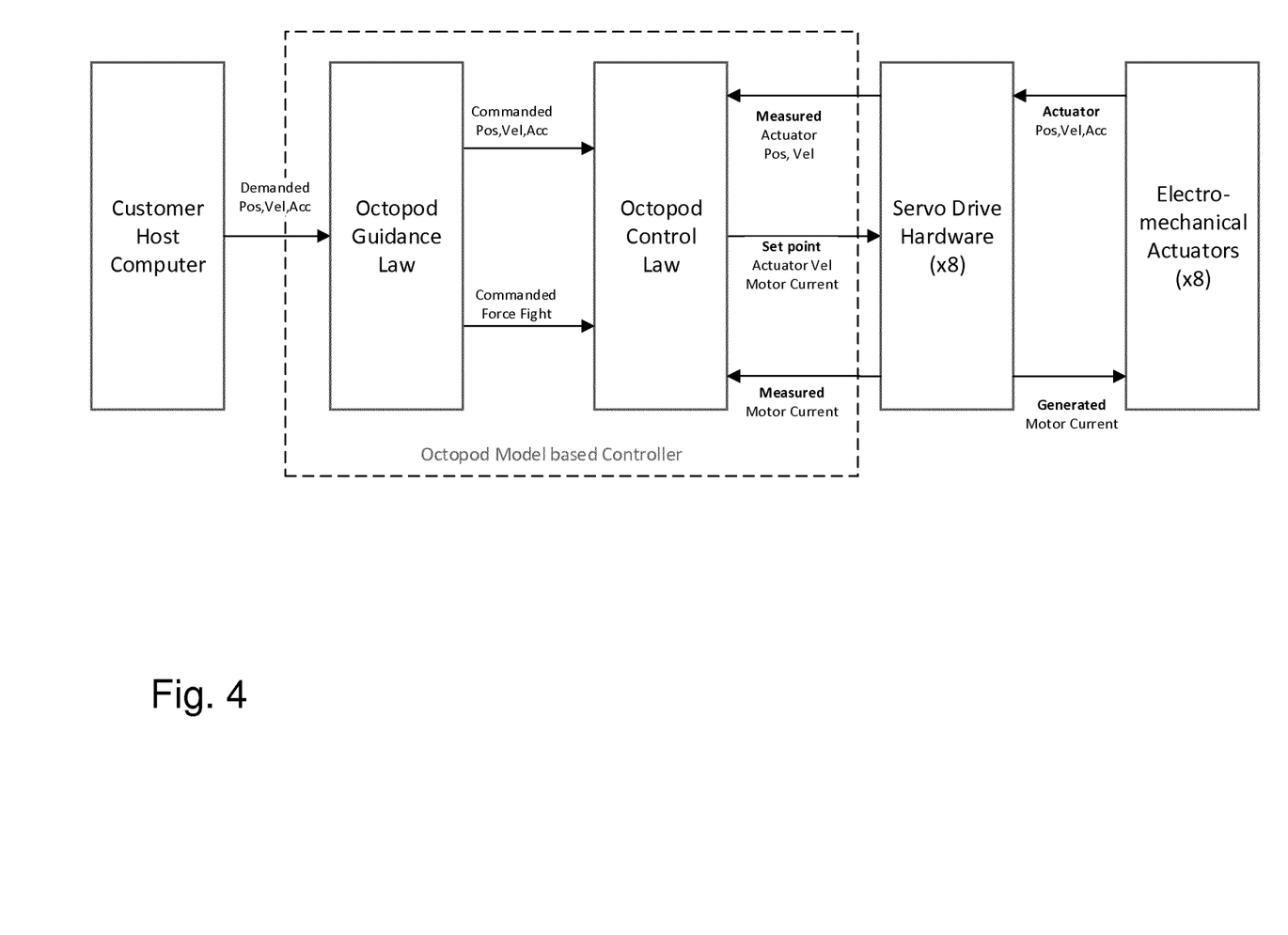
FIG. 4 is a flow diagram indicating how the controller of a platform system according to FIG. 1 communicates with servo drives connected to the electromechanical actuators.

FIG. 4 illustrates how the controller of a platform system according to FIG. 1, or Octopod Model based Controller, communicates with the eight servo drives each individually connected to eight long stroke electromechanical actuators. A host computer generates a demanded platform movement set-point in platform position, velocity and acceleration. This set-point may be adjusted by an optional motion cueing filter to obtain a filtered set-point (not shown). The controller is divided into two elements, namely the Octopod Guidance Law and the Octopod Control Law. The Octopod Guidance law accepts the demanded platform movement set-point in platform position, velocity and acceleration from an external host computer. The demanded set-point is transformed into a commanded set-point for the position velocity and acceleration of the platform and a force-fight set-point in for the electric motors of the electromechanical actuators. The Guidance Law is designed such that no operational or physical limits are exceeded when the platform is moved in accordance to these set-points. The Guidance Law will be further described making use of FIG. 5.

The objective of the Octopod Control Law in FIG. 4 is to move the motion platform in accordance to the commanded set-point as commanded by the Guidance Law. The platform system of FIG. 1 can be characterized as a multiple channel (i.e. multiple degrees of freedom), over-determined system (more actuators than degrees of freedom) which are highly cross-coupled. The Control Law (CL) is designed as a Multiple Input Multiple Output controller with feed-forward and feedback paths which is designed to decouple the cross-couplings between the degrees of freedom and handle force-fight issues which originate from having more actuators than degrees of freedom. The Control Law and its communication with the servo drives will be further described making use of FIG. 6.

Figure 5:
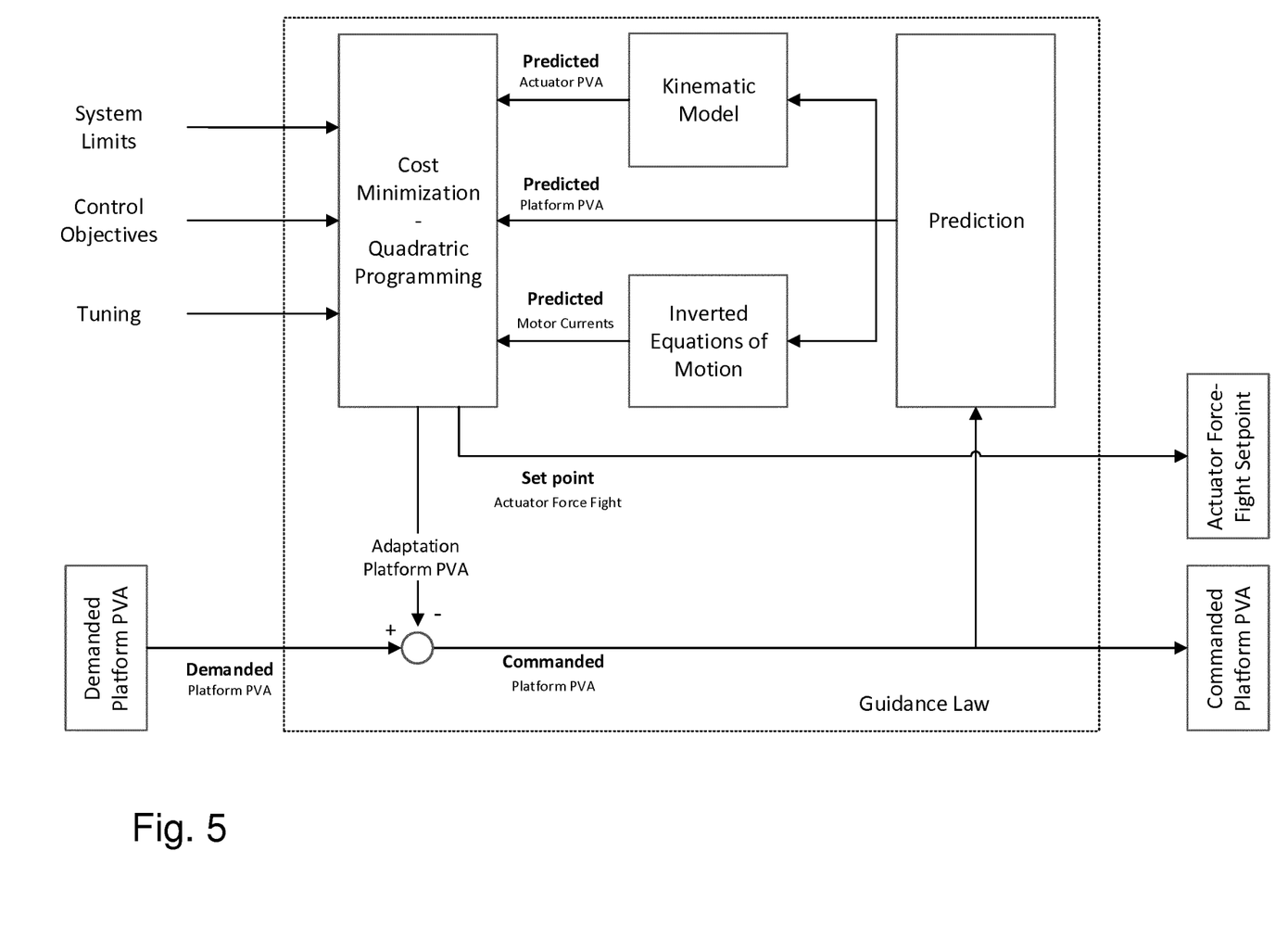
FIG. 5 is a flow diagram showing the Guidance Law of FIG. 4 in more detail.

FIG. 5 shows the Guidance Law of FIG. 4 in more detail. The input to the Guidance Law is a demanded platform movement set-point in platform position, velocity and acceleration (PVA). There are two outputs: the commanded position velocity and acceleration set-point for the platform and the force-fight set-point. The Guidance Law is designed such that the combination of the commanded PVA set-point for the platform and the actuator force-fight are such that the demanded platform PVA is optimally tracked while respecting the physical and operational limits of the movement platform system hardware. The core element of the Guidance Law is a Model Predictive Control (MPC) algorithm. MPC is based on an iterative, finite horizon optimization of the state of the movement platform system using a cost minimization strategy. In the method, costs are assigned to deviations of specific system controlled variables with respect to a desired reference. The method uses a dynamic model of the system to compute the optimum action that minimizes the costs while respecting specific system limits. The MPC algorithm can either be configured as an unconstrained or constrained format.

FIG. 5 shows that the Commanded platform PVA is projected a small time instance DT into the future. This results in the Predicted platform PVA which is a direct input for the MPC controller. There are two additional inputs to the MPC controller which also depend on the Predicted platform PVA. These are: the predicted actuator PVA which are computed using a kinematics model from the predicted platform PVA and the predicted motor currents which are computed from the Commanded PVA using the inverted equations of motion of the motion platform. Using these inputs, a cost minimization strategy is used to find the optimum adaptation of the Demanded platform PVA, and hence the Commanded platform PVA, in combination with a force-fight set-point. The parameters are control objectives, the motion platform physical limits and operational (usage) limits.

Figure 6:
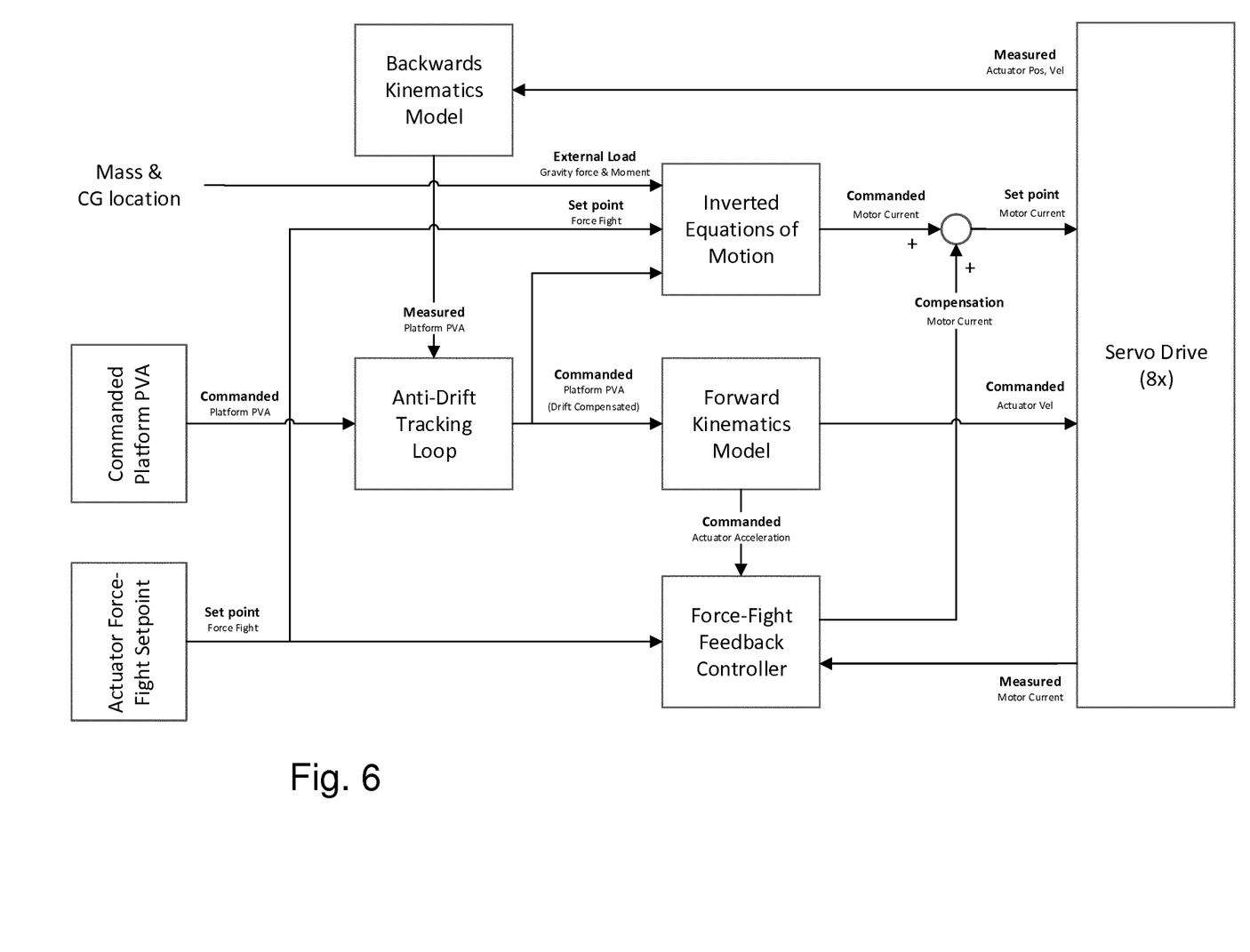
FIG. 6 is a flow diagram showing the Octopod Control Law of FIG. 4 in more detail.

FIG. 6 shows the Octopod Control Law of FIG. 4 in more detail. The Control Law is a Multiple Input Multiple Output controller with a feed forward path and feedback path. In the feed forward paths a kinematics model of the octopod (the movement platform system) is used to transform the Commanded platform PVA into eight commanded actuator PVA set-point signals. These are passed to the servo-drives as inputs. The Inverted equations of motion of the motion platform are used to transform the Commanded platform PVA into a motor current set-point for each actuator. For every instance in time, the motor currents Im can be expressed in terms of the Commanded Platform acceleration Ac, the gravity wrench Wg and force fight set-point as follows:

$$Im = K1*Ac + K2*Wg + K3*FF \qquad (8)$$

where:
Im is a size 8 vector containing the motor current
Ac is a size 6 vector which contains the commanded platform acceleration in 6 degrees of freedom
K1 is a (8×6) matrix which converts platform acceleration into motor current
Wg is a size 6 vector which contains the gravity wrench for the current commanded platform position
K2 is a 8×6 matrix which converts the gravity wrench into motor currents.

FF is a size 2 vector which contains the in-plane and out-of-plane force-fight set-points K3 is a (8×2) matrix which converts force-fight set-point into motor current The feedback paths are a feedback of force fight error and a feedback of platform position velocity and acceleration error. Feedback of force fight error, wherein the motor current set-point is adapted such that the difference between measured force-fight and force-fight set-point for in-plane and out-of-plane deformations, is counter acted. For any time instance, the measured force-fight FF_sensor causing in-plane and out-of-plane deformations can be computed as follows:

$$FF\_sensor=K5*Ac-K6*Im\_sensor \qquad (9)$$

in which:
FF_sensor is a size 2 vector which contains the measured force-fights which cause the in-plane and out-of-plane deformations, K5 is a 6×2 matrix with which the platform commanded acceleration is multiplied Im_sensor is a size 8 vector with the measured motor currents K6 is a 8×2 matrix with which the measured motor currents are multiplied FF_sensor is converted into a motor current error for each actuator using the following equation:

$$Im\_error=K4*(FF-FF\_sensor) \qquad (10)$$

In which:
Im_error is a size 8 vector with the 8 motor current errors
FF is a size 2 vector with the force-fight setpoint.
K4 is a 8×2 matrix which converts the difference between the set-point force-fight and measured force-fight into motor current error.

The feedback of platform position velocity and acceleration error uses the measured actuator position and velocity sensor data to reconstruct the measured platform PVA using a backwards kinematics model of the motion platform. An anti-drift tracking loop controller uses the error between the commanded platform PVA and measured platform PVA, to slowly adjust the commanded platform PVA such that the error is reduced as shown in FIG. 6.

The invention claimed is:

1. An overdetermined movement platform system, comprising a base; a platform movable along 6 degrees of freedom relative to said base; at least eight long-stroke actuators, wherein each actuator couples the base with the platform and wherein an overdetermined system is defined in that an actuator force-fight may exist which deforms the platform depending on the orientation of the actuators with respect to the platform and a controller which (a) is configured to adapt a demanded platform movement set-point to a commanded platform movement set-point, (b) is configured to move the eight long-stroke actuators such that the commanded platform movement set-point is achieved and (c) is configured to dynamically redistribute the forces as exercised by the actuators on the platform between the actuators.

2. A movement platform system according to claim 1, wherein the long stroke actuators are hydraulic actuators, electromechanical actuators or electromagnetic actuators.

3. A movement platform system according to claim 1, wherein the controller comprises a guidance module configured to adapt the demanded platform movement set-point to a commanded platform movement set-point by a counter movement for the platform and configured to calculate a force-fight set-point, wherein the counter movement and force-fight set-point are derived from a model predictive control algorithm which uses a cost-minimizing control strategy.

4. A movement platform system according to claim 3, wherein the long stroke actuators are electromechanical actuators provided with a motor configured to receive a motor current from a servo drive and wherein the platform system has predetermined operational and performance limits comprising of platform domain limits and actuator domain limits wherein the model predictive control algorithm uses a cost-minimizing control strategy which is configured to let the platform stay within its predetermined operational and performance limits.

5. A movement platform system according to claim 4, wherein the controller is comprised of a control law module which is configured to (b) move the eight long-stroke actuators such that the commanded platform movement set-point is achieved and (c) is configured to dynamically redistribute the forces as exercised by the actuators on the platform between the actuators by providing a velocity and motor current set-point for each individual servo drive using the platform movement set-point and wherein the motor current set-point is compensated for the difference of the actual force fight signal and the force fight set-point as obtained in the guidance module.

6. A movement simulator according to claim 5, wherein the control law module is configured as a Multiple Input Multiple Output controller by two feed forward paths (x) and two feedback paths (y):
(x) two feed forward paths wherein the velocity set-point for each individual servo drive is determined using the commanded platform movement set-point as input and the motor current set-point is determined using the commanded platform movement set-point and the force fight set-point as input and
(y) two feedback paths wherein the error between actual platform movement and the commanded platform movement set-point is reduced and wherein the motor current set-point is adapted such that the difference between actual force-fight and the force-fight set-point is counter acted.

7. A movement simulator according to claim 6, wherein each actuator is provided with sensors configured to obtain measured actuator position and velocity sensor data and wherein the actual platform movement is actual platform position, velocity and acceleration which actual position, velocity and acceleration is reconstructed using a backwards kinematics model of the motion platform system and the measured actuator position and velocity sensor data as input.

8. A movement platform system according to claim 6, wherein the platform system has eight actuators and a platform having four corners and two diagonals and wherein the actual force-fight signal between the eight actuators is determined using the actual motor currents of the eight servo drives, the actual acceleration of the eight actuators and the platform position as input to calculate (i) the force-fight of the eight actuators in the plane of the platform which force-fight causes in-plane deformation where both diagonals of the platform are squeezed together and (ii) as the force-fight of the eight actuators perpendicular to the plane of the platform which force-fight causes out-of-plane deformations where one diagonal of the platform is pushed up and one diagonal of the platform is pushed down.

9. A movement platform system according to claim 8, wherein the control law module is configured as a Multiple Input Multiple Output controller by two feed forward paths (x) and two feedback paths (y):

(x) two feed forward paths wherein the velocity set-point for each individual servo drive is determined using the commanded platform movement set-point as input and the motor current set-point is determined using the commanded platform movement set-point and the force fight set-point as input and (y) two feedback paths wherein the error between actual platform movement and the commanded platform movement set-point is reduced and wherein the motor current set-point is adapted such that the difference between actual force-fight and the force-fight set-point is counter acted, and wherein each actuator is provided with sensors configured to obtain measured actuator position and velocity sensor data and wherein the actual platform movement is actual platform position, velocity and acceleration which actual position, velocity and acceleration is reconstructed using a backwards kinematics model of the motion platform system and the measured actuator position and velocity sensor data as input.

10. A movement platform system according to claim 1, wherein the commanded and demanded platform movement set-point is a commanded and demanded set-point for platform position, velocity and acceleration.

11. A movement platform system according to claim 1, wherein the controller comprises a guidance module configured to adapt the demanded platform movement set-point to a commanded platform movement set-point by a counter movement for the platform and configured to calculate a force-fight set-point, wherein the counter movement and force-fight set-point are derived from a model predictive control algorithm which uses a cost-minimizing control strategy and wherein the commanded and demanded platform movement set-point is a commanded and demanded set-point for platform position, velocity and acceleration.

12. Method to control an overdetermined movement platform system comprising a base; a platform movable along 6 degrees of freedom relative to said base; at least eight long-stroke actuators coupling the base with the platform by performing a guidance step (a) and a control law step (b), wherein an overdetermined system is defined in that an actuator force-fight may exist which deforms the platform depending on the orientation of the actuators with respect to the platform, and wherein in guidance step (a) a demanded platform movement set-point is adapted to a commanded platform movement set-point by calculating a counter movement for the platform and by calculating a force-fight set-point, wherein the counter movement and force fight set-points are derived using a model predictive control algorithm which uses a cost-minimizing control strategy, and in control law step (b) the long-stroke actuators are moved such that the commanded platform movement set-point of (a) is achieved while dynamically redistributing the forces as exercised by the actuators on the platform between the actuators according to the force-fight set-point obtained in (a).

13. A method according to claim 12, wherein the commanded and demanded platform movement set-point is a commanded and demanded set-point for platform position, velocity and acceleration.

14. A method according to claim 12, wherein the long stroke actuators are electromechanical actuators provided with a motor which receive a motor current from a servo drive and wherein the platform system has predetermined operational and performance limits comprising of platform domain limits and actuator domain limits, including motor and servo-drive limits, and wherein the model predictive control algorithm uses a cost-minimizing control strategy which is configured to let the platform stay within its performance limits.

15. A method according to claim 14, wherein the control law step (b) is comprised of a feed forward path (x) and a feedback path (y) according to (x) two feed forward paths wherein the velocity set-point for each individual servo drive is determined using the commanded as input and the motor current set-point is determined using the commanded or adjusted commanded platform movement set-point and the force fight set-point as input and (y) two feedback paths wherein the error between actual platform position, velocity and acceleration and the commanded or adjusted commanded platform movement set-point is reduced and wherein the motor current set-point is adapted such that the difference between actual force-fight and the force-fight set-point is counter acted.

16. A method according to claim 15, wherein the actual platform position, velocity and acceleration is reconstructed using a backwards kinematics model of the motion platform system and measured actuator position and velocity sensor data as input.

17. A method according to claim 15, wherein the actual force-fight between the eight actuators of a movement platform system having eight actuators and a platform having four corners and two diagonals is determined using the actual motor currents of the eight servo drives, the actual acceleration of the eight actuators and the platform position as input to calculate (i) the force-fight of the eight actuators in the plane of the platform which force-fight causes in-plane deformation where both diagonals of the platform are squeezed together and (ii) as the force-fight of the eight actuators perpendicular to the plane of the platform which force-fight causes out-of-plane deformations where one diagonal of the platform is pushed up and one diagonal of the platform is pushed down.

\* \* \* \* \*